(12) United States Patent
Steinbach

(10) Patent No.: US 7,331,434 B2
(45) Date of Patent: Feb. 19, 2008

(54) IMPACT ABSORBER

(75) Inventor: Guido Steinbach, Sankt Augustin (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/564,477

(22) Filed: Nov. 29, 2006

(65) Prior Publication Data

US 2007/0138717 A1    Jun. 21, 2007

(30) Foreign Application Priority Data

Dec. 19, 2005   (DE) ............... 10 2005 061 108

(51) Int. Cl.
*F16F 9/48* (2006.01)
(52) U.S. Cl. .............. 188/289; 267/35; 267/120
(58) Field of Classification Search .......... 188/129, 188/130, 289, 322.22, 381; 267/35, 134, 267/201, 120
See application file for complete search history.

(56) References Cited

U.S. PATENT DOCUMENTS

| 3,152,667 | A | * | 10/1964 | Powell | 188/289 |
| 3,693,768 | A | * | 9/1972 | Erdmann | 188/289 |
| 3,856,285 | A | * | 12/1974 | Yamada | 267/202 |
| 4,452,437 | A | * | 6/1984 | Lochner | 267/64.22 |
| 4,462,578 | A | * | 7/1984 | Camilleri | 267/209 |
| 4,765,444 | A | * | 8/1988 | Bauer et al. | 188/129 |
| 4,834,347 | A | * | 5/1989 | Pauliukonis | 267/64.12 |
| 4,877,114 | A | * | 10/1989 | Taylor | 188/285 |
| 4,946,008 | A | * | 8/1990 | Bauer et al. | 188/129 |
| 5,862,895 | A | * | 1/1999 | Ricard | 188/289 |

FOREIGN PATENT DOCUMENTS

DE        34 19 165 A1    11/1985

\* cited by examiner

*Primary Examiner*—Chris Schwartz
(74) *Attorney, Agent, or Firm*—McGlew and Tuttle, P.C.

(57) ABSTRACT

An impact absorber is provided for absorbing impact forces especially in case of a collision of a motor vehicle. The impact absorber includes an inner tube (1), which can be pushed into an outer tube (2) in a telescopic manner and which is closed with a bottom plate (3) at its free end projecting from the outer tube (2). Starting from the bottom plate (3) in the direction of the longitudinal axis (4) of the impact absorber, a gas space (5) filled with pressurized gas and a first, a fluid-filled liquid space (7), which is separated from the gas space (5) by a wall (6) displaceable in the inner tube (1), are arranged in the interior of the inner tube (1). The liquid space (7) is in connection through a throttle element with a second, fluid-filled liquid space (13), which adjoins the first liquid space (7) in the direction of the longitudinal axis (4) and is closed by a piston (9) fixed in the outer tube (2) towards the free end of the outer tube (2) in a liquid-tight manner.

19 Claims, 3 Drawing Sheets

IMPACT ABSORBER

CROSS REFERENCE TO RELATED APPLICATIONS

This application claims the benefit of priority under 35 U.S.C. § 119 of German Patent Application DE 10 2005 061 108.7 filed Dec. 19, 2005, the entire contents of which are incorporated herein by reference.

FIELD OF THE INVENTION

The present invention pertains to an impact absorber for absorbing impact forces, especially in case of the collision of vehicles or the collision of vehicles with an obstacle.

BACKGROUND OF THE INVENTION

Impact absorbers of this type are known, for example, from DE 34 19 165 A1, in which impact absorbers are described that comprise two tubes that are displaceable one inside the other, wherein an inner tube, which is closed towards the outside, has a gas space, which is provided with a gas filling, which is under high pressure. A first liquid space, which is separated from the gas space by a separating piston, is likewise located in the inner tube. Moreover, a throttle element in the form of a disk with a throttling opening, which hydraulically connects the first liquid space to a second liquid space, is located in the inner tube. If an impact absorber is to absorb impact forces, which develop especially in a collision of a motor vehicle with an obstacle, the inner tube immerses into the outer tube. The hydraulic fluid located in the second liquid space is now displaced through the throttling opening into the first liquid space, and the gas cushion located in the gas space above the separating piston is compressed at the same time. The increase in volume in the first liquid space takes place, by contrast, against the force of a gas space forming a gas spring, which is additionally pretensioned as a result. The pretension of the gas spring, generated during the immersion of the inner tube into the outer tube, brings about the return of the impact absorber into the starting position as soon as the forces acting on the inner tube from the outside no longer act. The absorption of the impact forces takes place without permanent damage to the impact absorber at impact velocities of up to about 8 km/hour. The energy is dissipated by a deformation piston at higher impact velocities in the impact absorber disclosed in the above-mentioned document. The energy is dissipated due to the widening of the outer tube in the axial direction. Such an impact absorber, which is preferably attached to rigid carrier parts of the vehicle in automotive engineering, acts nearly as a rigid unit because of the absorbing force acting as a function of the velocity. A path limitation is provided to allow the crumple zone of the vehicle to become active in this case.

SUMMARY OF THE INVENTION

Impact absorbers of the type of this class, which perform their task in the manner described, have proved, in principle, to be successful in practice. However, the design of such impact absorbers is associated with a rather substantial manufacturing technical effort despite the manageable number of components. Based on this, the object of the present invention is to provide an impact absorber of the type described in the introduction, which makes possible manufacture at a low cost with reduced number of parts. Moreover, an increased degree of energy absorption shall be achieved.

It is essential here for the present invention that an impact absorber for absorbing impact forces, especially during the collision of a motor vehicle with an obstacle, is provided with an inner tube, which can be pushed into an outer tube in a telescopic manner and which is closed with a bottom plate at its free end projecting from the outer tube, wherein a gas space filled with a pressurized gas and a first, fluid-filled liquid space separated from the gas space by a wall displaceable in the inner tube are arranged in the interior of the inner tube, starting from the bottom plate in the direction of the longitudinal direction of the impact absorber, the liquid space being in connection through a throttle element with a second, fluid-filled liquid space, which adjoins the first liquid space in the direction of the longitudinal axis and is closed by a piston fixed in the outer tube in a liquid-tight manner towards the free end of the outer tube, characterized in that the throttle element is an integral part of the piston and the second liquid space is arranged in a partial area of the longitudinal extension of the piston in an annular pattern between the inner wall of the outer tube and the outer wall of the piston.

Due to the novel design embodiment, an especially compact design of the impact absorber is embodied, on the one hand, and the throttle element no longer needs to be manufactured and mounted as a separate component (as is the case according to the state of the art), because its task is assumed by the piston itself due to its special design wherein the piston helps form the throttle element.

The throttle element present at the piston may be designed, corresponding to a first advantageous embodiment, as a slot-like opening at the end of the piston facing the inner tube between the inner wall of the inner tube and the outer wall of the piston, the slot-like opening [being able to be] designed, on the one hand, as a circular ring slot and, on the other hand, as one or more groove slots with an essentially rectangular cross section, the groove slots being prepared as a recess in a partial area of the outer circumference of the end of the piston facing the outer tube.

Designing the throttle element as a circular ring slot has proved to be especially advantageous in practice because it can be manufactured in one manufacturing operation, without finishing, in connection with another expedient embodiment of the piston in which the latter in designed such that the piston is manufactured from plastic, preferably according to the injection molding method.

Provisions are made in a supplementary additional advantageous embodiment of the subject of the present invention for the cross section of the slot-like opening to decrease while the inner tube is being pushed into the outer tube. The reduction leads to a continuous reinforcement of the impact absorber, the deeper the inner tube immerses into the outer tube to absorb impact forces, so that an increase in the degree of energy absorption is achieved. The change in the slot-like opening and consequently in the throttle cross section may be brought about in different ways depending on whether the slot-like opening is designed as a ring slot or as a groove slot.

If the slot-like opening is designed as a circular ring slot, the piston is designed as a truncated cone at its end facing the inner tube, the difference between the smallest diameter and the largest diameter of the truncated cone at its upper end and at its lower end, respectively, being an indicator of the change of the ring slot cross section.

In those cases in which the slot-like opening is designed as a groove slot with an essentially rectangular cross section, a plurality of slot-like openings being able to be distributed symmetrically over the outer circumference of the piston, the change in the throttle cross section can be brought about by the depth of the groove of the groove slot or groove slots prepared in the piston decreasing in the direction of the longitudinal axis of the piston from the tip of the piston towards the foot of the piston.

Moreover, provisions are made in an advantageous variant of the impact absorber according to the present invention for the outer tube to have, at its free end facing away from the inner tube, a shoulder projecting towards the inner side, with which shoulder the corresponding free end of the piston comes into contact. The shoulder may be designed as a conical reduction of the inner cross section of the outer tube, the corresponding free end of the piston being adapted to the cross section reduction or the conicity of the inner cross section of the outer tube.

The design embodiment described makes it possible in a simple manner to reinforce the impact absorber in those cases in which the path of displacement of the inner tube within the outer tube is generated for absorbing impact forces. The additional impact forces are directly transmitted in this case from the inner tube to the piston and from here directly to the outer tube via the shoulder having a corresponding design and into the parts of the body at which the outer tube is fixed in a non-positive or positive-locking manner.

The above-described manufacture of the piston from a plastic according to the injection molding method has, moreover, the advantage that by selecting a suitable plastic, which has a predetermined melting point in the range above 150° C., the corresponding piston makes it possible for the pressurized hydraulic liquid to escape due to the evolution of heat after melting in case of a fire of the motor vehicle, so that explosion of the impact absorber is reliably ruled out.

In addition, the wall arranged between the gas space and the first liquid space may likewise be made of a plastic, which has a predetermined melting point in the range above 150° C. Due to this design, the gas cushion, which is additionally under pressure, can additionally escape in case of fire in case of melting of the wall as a consequence of the elevated temperatures generated in case of fire, so that explosion of the impact absorber as a consequence of the gas pressure is ruled out.

Two exemplary embodiments of the subject of the present invention will be explained in more detail below on the basis of the drawings attached. The exemplary embodiments differ primarily by the throttle element, which is an integral part of the piston, being designed as a ring slot or as a groove slot.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
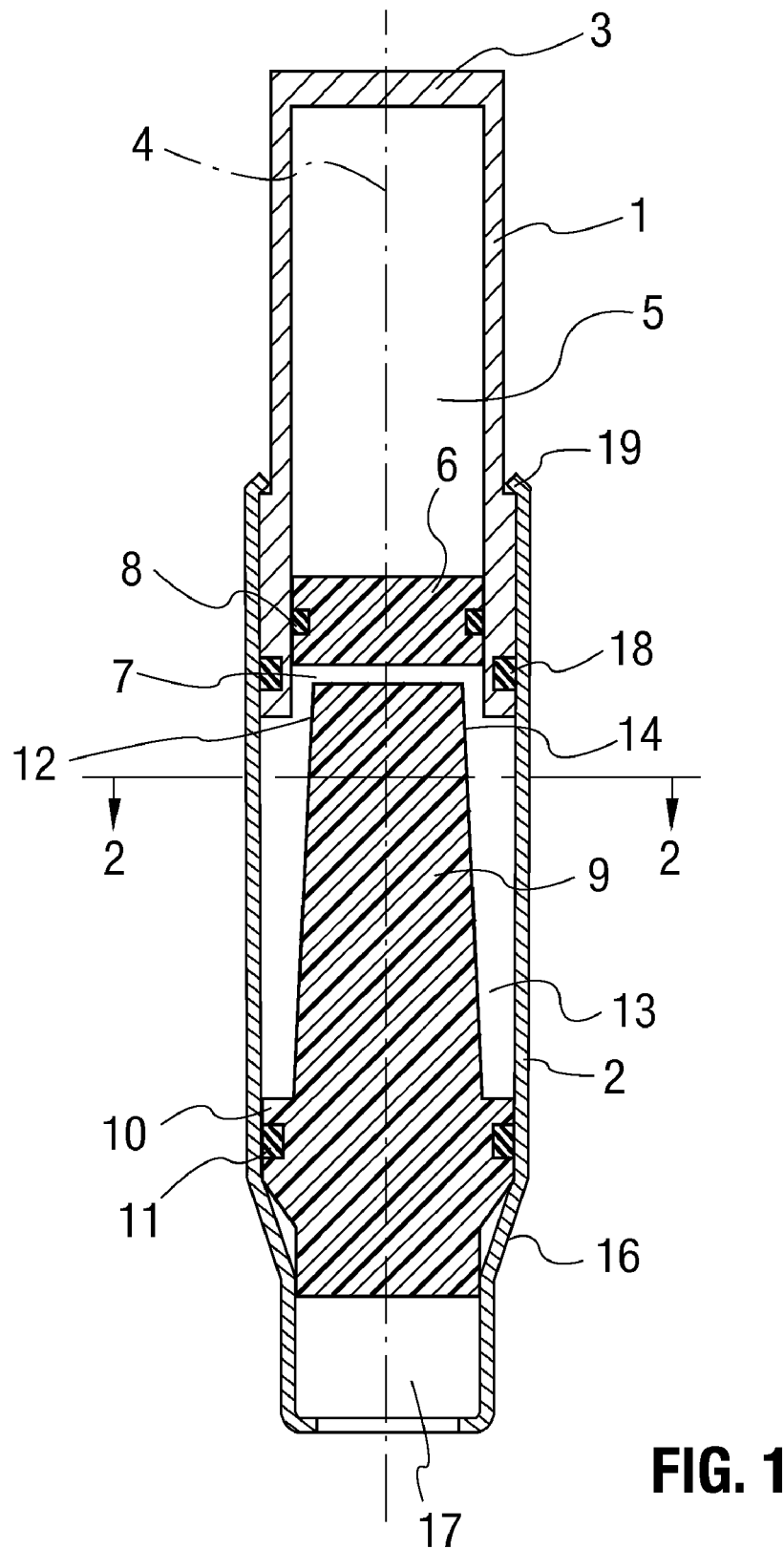
FIG. 1 is a longitudinal sectional view of an impact absorber according to first embodiment of the invention.

Referring to the drawings in particular, The impact absorber, whose cross section is shown in FIG. 1, comprises essentially an inner tube 1, which can be pushed into an outer tube 2 in a telescopic manner. At its free end projecting from the outer tube 2, the inner tube is closed with a bottom plate 3. Starting from the bottom plate 3 in the direction of the longitudinal axis 4 of the impact absorber, a gas space 5 filled with pressurized gas is located first in the interior of the inner tube 1. On its side facing away from the bottom plate 3, the gas space 5 is separated from a first liquid space 7 filled with a fluid by a wall 6, which is displaceable in the inner tube 1. The wall 6 is provided with a sealing ring 8, so that the wall is sealed against the inner wall of the inner tube 1.

The extension of the first liquid space 7 is limited, on the one hand, by the wall 6 and, at its end located opposite the wall 6, by a piston 9, which is in turn arranged rigidly within the outer tube 2. The piston 9 is designed such that it has a lower area 10, which corresponds to the internal cross section of the outer tube 2 and in which a sealing element 11 designed as a seal extending circularly in a ring-shaped pattern is arranged. The lower area 10 of the piston 9 is adjoined in the direction of the inner tube by an upper area 12, which has a reduced cross section compared to the lower area 10. Due to the reduced cross section in the upper area 12, a ring-shaped slot is formed between the outer side of the piston 9 and the inner side of the outer tube 2, which is likewise filled with a fluid, preferably a hydraulic fluid, as a second liquid space 13.

The upper free end of the upper area 12 of the piston 9 is designed such that a slot-like opening 14 is formed between it and the inner tube 1, which can be introduced into the outer tube. This slot-like opening 14 acts as a throttling opening and makes possible the passage of the fluid present in the second liquid space 13 into the first liquid space 7 in the case in which the inner tube 1 immerses into the outer tube 2 because of impact forces acting on the inner tube 1.

Figure 4:
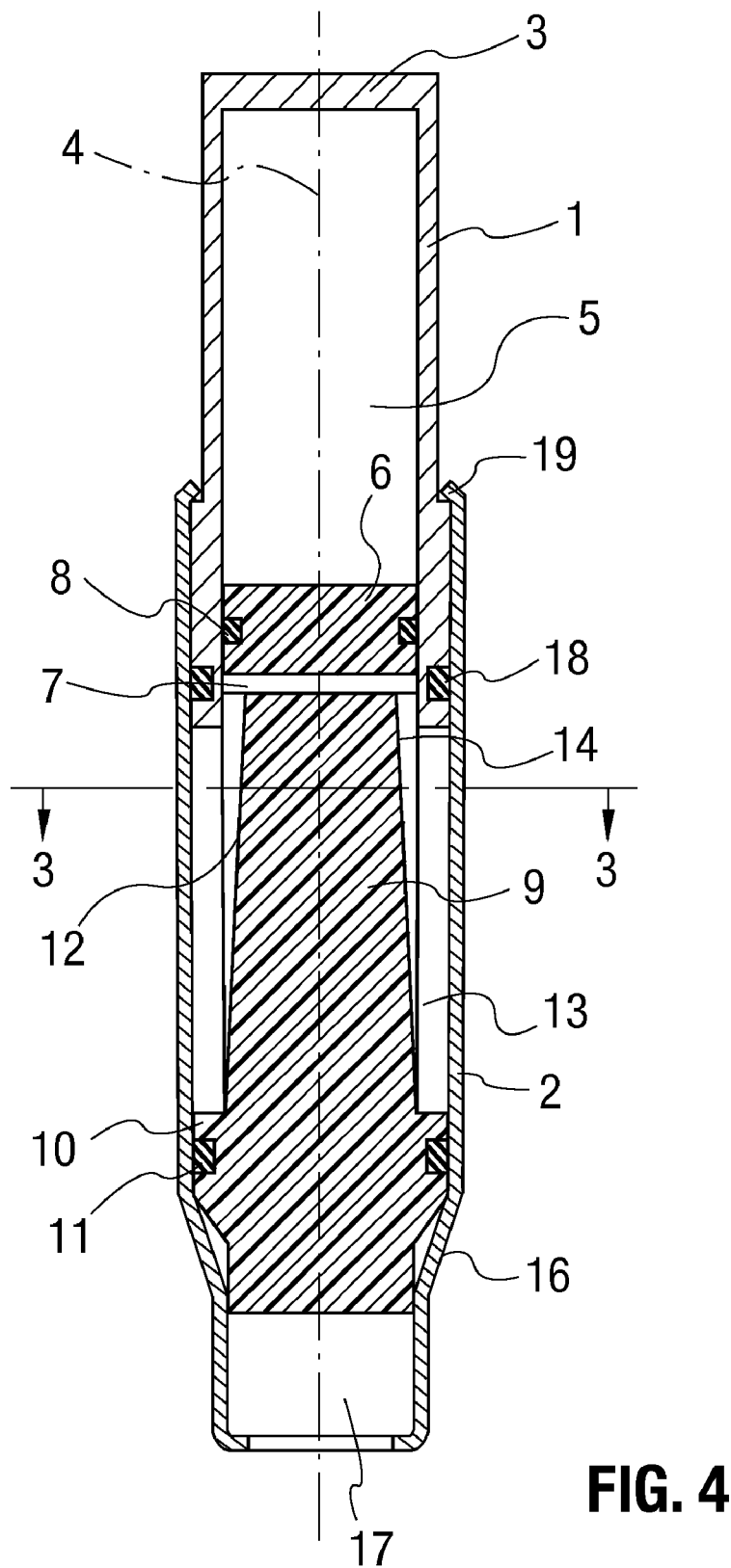
FIG. 4 is a longitudinal sectional view of an impact absorber according to a second embodiment of the invention.

FIG. 4 shows an arrangement that is essentially the same as that of the embodiment of FIG. 1, except that the throttle element is formed from four groove slots 15 distributed over the circumference of the piston.

Figure 2:
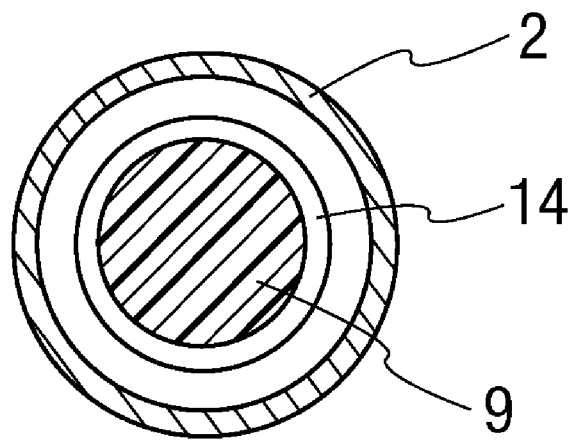
FIG. 2 is a cross section through the impact absorber from FIG. 1 along line 2-2 from FIG. 1, where the throttle element is designed as a ring slot.
Figure 3:
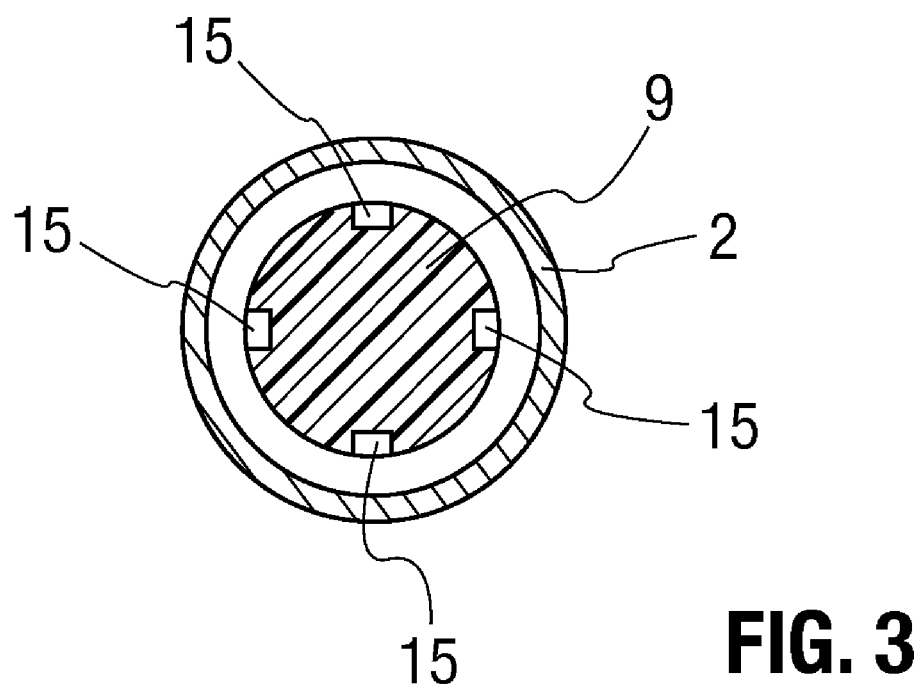
FIG. 3 is a cross section through the impact absorber from FIG. 4 along line 3-3, where the throttle element is formed from four groove slots distributed over the circumference of the piston.

As can be recognized from FIGS. 1 and 4 in conjunction with FIGS. 2 and 3, the slot-like opening 14 may be designed, on the one hand, as a circular ring slot corresponding to FIG. 2. As an alternative to this, it is possible to design the slot-like opening 14 as a groove slot 15, and, as this appears from FIG. 3, four groove slots 15 are arranged symmetrically on the outer circumference of the upper area 12 of the piston 9.

In the two exemplary embodiments according to FIGS. 1 and 2 and according to FIGS. 3 and 4, the size of the slot-like opening 14 is reduced as the inner tube 1 immerses more deeply into the outer tube 2 in case it is necessary to absorb impact forces. On the one hand, the reduction of the throttling cross section is achieved by the design such that the upper area 12 of the piston 9 is designed as a ring slot in the form of a truncated cone, whereas, on the other hand, when the slot-like opening 14 is designed as a groove slot (as groove slots), the groove depth of the four groove slots 15 arranged on the outer circumference of the piston 9 decreases continuously from the upper free end of the piston 9, which free end faces the wall 6, to the end of the upper area 12, which area is adjacent to the lower area 10. The reduction of the slot-like opening 14 acting as a throttle brings about an increase in the efficiency of energy absorption as a consequence of reinforcement of the impact absorber due to the fact that depending on the size of the slot-like opening 14, less liquid can flow into the upper liquid space 7 from the lower liquid space 13.

Two different operating situations are distinguished, in general, in the mode of operation of the impact absorber. When impact forces are absorbed, especially in case of the collision of a motor vehicle with an obstacle, when the motor vehicle has a speed of less than 8 km/hour, the gas volume present in the gas space 5 is compressed at the same time due to the transfer of hydraulic fluid from the second liquid space 13 to the first liquid space 7, as a result of which additional restoring forces are made available by the gas volume. These restoring forces bring about the automatic re-expansion of the gas cushion in the gas space 5 in the case in which no additional compressive forces act on the inner tube 1 from the outside. If the path of displacement of the inner tube 1 within the outer tube 2 is used up as a consequence of an increased speed above 8 km/hour and increased impact forces resulting herefrom, the lower edge of the inner tube 1 comes into direct contact with the lower area 10 of the piston 9. The impact forces still acting are directly transmitted in this case from the inner tube 1 to the outer tube 2 via the contact surface between the inner tube 1 and the piston 9. The outer tube 2 is provided for this purpose, at a lower end facing away from the inner tube 1, with a shoulder 16, which projects towards the inner side of the outer tube 2 and is designed as a conical reduction of the inner cross section in this exemplary embodiment.

The lower area 10 of the piston 9 is correspondingly adapted to the shoulder 16 of the outer tube 2, so that reliable transmission of the forces applied to the piston 9 by means of the inner tube 1 to the outer tube 2 and consequently to body-side elements of the motor vehicle is guaranteed.

Finally, it shall also be pointed out that both the piston 9 and the wall 6 may be manufactured from a plastic, which can have a predetermined melting point in the range above 150° C. This special measure is used to prevent the impact absorber from exploding essentially because of an increase in the pressure in the interior space in case of fire, because both the absorbing liquid and the gas cushion can escape to the outside during the melting of the piston 9 and of the wall 6 via an opening 17 present at the free end of the outer tube 2.

It shall additionally be added that a circular seal 18 is additionally arranged between the inner tube 1 and the outer tube 2 for sealing purposes. Separation of the inner tube 1 and the outer tube 2 is additionally prevented after the assembly of the components by a beading 19 at the upper free end of the outer tube 2, which said free end faces the inner tube 1.

It is obvious that the above-mentioned features of the present invention can be used not only in the particular combination indicated, but also in other combinations or alone without going beyond the scope of the present invention. While specific embodiments of the invention have been shown and described in detail to illustrate the application of the principles of the invention, it will be understood that the invention may be embodied otherwise without departing from such principles.

APPENDIX

List of Reference Numbers

| | |
|---|---|
| 1 | Inner tube |
| 2 | Outer tube |
| 3 | Bottom plate |
| 4 | Longitudinal axis |
| 5 | Gas space |
| 6 | Wall |
| 7 | Liquid space |
| 8 | Sealing ring |
| 9 | Piston |
| 10 | Lower area |
| 11 | Sealing element |
| 12 | Upper area |
| 13 | Liquid space |
| 14 | Slot-like opening |
| 15 | Groove slot |
| 16 | Shoulder |
| 17 | Opening |
| 18 | Sealing ring |
| 19 | Beading |

What is claimed is:

1. An impact absorber for absorbing impact forces including absorbing forces in case of a collision of a motor vehicle with an obstacle, the impact absorber comprising:
    an inner tube with a closed bottom plate;
    an outer tube having opposite first and second open ends, said inner tube being positioned to be pushed into said first open end of said outer tube in a telescopic manner, an end of said inner tube with said closed bottom plate comprising a free end projecting from said outer tube;
    a wall displaceable in said inner tube, said inner tube and said wall cooperating to form, a gas space filled with pressurized gas, followed in a direction of a longitudinal axis by a first fluid-filled liquid space separated from said gas space by said wall and a second fluid-filled liquid space;
    a throttle element, said second fluid-filled liquid space being in fluid communication with said first fluid-filled space through said throttle element; and
    a piston arranged in an interior of said outer tube and fixed in a liquid-tight manner relative to an inner wall of said outer tube towards said second open end of said outer tube, said second fluid-filled space adjoining said first fluid-filled space in a direction of said longitudinal axis and being closed by said piston, said throttle element comprising an integral part of said piston and said second fluid-filled space being arranged in a ring-shaped pattern between said inner wall of said outer tube and said outer wall of said piston, said piston being formed from a plastic.

2. An impact absorber in accordance with claim 1, wherein said throttle element comprises a slot-like opening at an end of said piston, said end of said piston facing said inner tube, between an inner wall of said inner tube and an outer wall of said piston.

3. An impact absorber in accordance with claim 2, wherein said slot-like opening comprises a groove slot with an essentially rectangular cross section, said groove slot including a recess in a partial area of an outer circumference of said end of said piston.

4. An impact absorber in accordance with claim 3, wherein a plurality of said slot-like openings are arranged symmetrically over said outer circumference of said piston.

5. An impact absorber in accordance with claim 2, wherein said piston comprises a truncated cone at an end facing said inner tube.

6. An impact absorber in accordance with claim 2, wherein a cross section of said groove slot forming said slot-like opening decreases due to the reduction of the groove depth of the recess in the direction of said longitudinal axis.

7. An impact absorber in accordance with claim 1, wherein said second open end of said outer tube faces away from said inner tube with a shoulder projecting towards an inner side and with which a corresponding free end of said piston comes into contact.

8. An impact absorber in accordance with claim 7, wherein said shoulder comprises a conical reduction of an inner cross section of said outer tube.

9. An impact absorber in accordance with claim 8, wherein said corresponding free end of said piston is adapted to said reduction of the inner cross section of said outer tube.

10. An impact absorber in accordance with claim 1, wherein said piston plastic has a predetermined melting point in the range above 150 C.

11. An impact absorber in accordance with claim 1, wherein said wall between said gas space and said first liquid space is manufactured from a plastic that has a predetermined melting point in the range above 150 C.

12. An impact absorber in accordance with claim 1, further comprising a circular sealing element arranged between said piston and said inner wall of said outer tube.

13. An impact absorber in accordance with claim 1, wherein:
said outer tube defines an interior space between said piston and said second open end of said outer tube, said interior space being a free space.

14. A motor vehicle impact absorber comprising:
an inner tube with a closed plate free end;
an outer tube having first and second opposite open ends, said inner tube being positioned to be pushed into said second open end of said outer tube in a telescopic manner, said free end projecting from said outer tube;
a wall mounted to an inner wall of said inner tube to be displaceable in said inner tube;
a piston arranged in an interior of said outer tube and fixed in a liquid-tight manner relative to an inner wall of said outer tube towards said second open end of said outer tube, said inner tube and said wall cooperating to form a gas space filled with pressurized gas, said inner tube, said piston and said wall cooperating to form a first fluid-filled space separated from said gas space by said wall and said outer tube and said piston cooperating to form a second fluid-filled space, arranged in a ring-shaped pattern between an inner wall of said outer tube and an outer wall of said piston, said piston being formed from a plastic; and
a throttle element comprising an integral part of said piston, said second fluid-filled liquid space being in fluid communication with said first fluid-filled space through said throttle element.

15. An impact absorber in accordance with claim 14, wherein:
said outer tube defines an interior space between said piston and said second open end of said outer tube, said interior space being a free space.

16. An impact absorber comprising:
an outer tube having first and second open ends, said second end being opened to a surrounding environment;
an inner tube having a first closed end and a second open end, said inner tube being slidably arranged in said first open end of said outer tube in a telescopic manner, said first closed end projecting from said outer tube;
a gas wall slidably mounted along an inner wall of said inner tube to be displaceable in said inner tube, said inner tube and said gas wall cooperating to form a gas space filled with pressurized gas;
a piston arranged in an interior of said outer tube and fixed in a liquid-tight manner to an inner wall of said outer tube at a piston mounting position, said piston being formed of a fire degradeable material;
a throttle element comprising an integral part of said piston and said second end of said inner tube, said integral part of said piston extending from said piston mounting position toward said first end of said outer tube, and movable into and out of said second end of said inner tube;
a first fluid-filled space defined by said gas wall, said inner tube, and said throttle element, said first fluid-filled space being separated from said gas space by said gas wall;
a second fluid-filled space defined by said outer tube, said piston and said throttle element, said second fluid-filled space being arranged in a ring-shaped pattern between said inner wall of said outer tube and an outer wall of said piston, said second fluid-filled liquid space being in fluid communication with said first fluid-filled space through said throttle element, said piston being arranged to have said second fluid-filled space communicate with the surrounding environment through said second open end of said outer tube when said material of said piston degrades in a fire.

17. An absorber in accordance with claim 16, wherein:
said wall is formed of a fire degradeable material;
said wall, said inner tube, said outer tube, and said piston are arranged to have said first fluid-filled space and said gas space communicate with the surrounding environment through said second open end of said outer tube when said piston and said wall degrade in a fire.

18. An absorber in accordance with claim 16, wherein:
said material of said piston is a plastic.

19. An absorber in accordance with claim 16, wherein:
said material of said piston melts at 150° C.

* * * * *